US012182918B2

(12) United States Patent
Noh et al.

(10) Patent No.: US 12,182,918 B2
(45) Date of Patent: Dec. 31, 2024

(54) METHOD OF GENERATING CINEMAGRAPH BASED ON DEEP LEARNING

(71) Applicant: KOREA ADVANCED INSTITUTE OF SCIENCE AND TECHNOLOGY, Daejeon (KR)

(72) Inventors: Junyong Noh, Daejeon (KR); Ha Young Chang, Daejeon (KR); Kwanggyoon Seo, Daejeon (KR); Jung Eun Yoo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 260 days.

(21) Appl. No.: 17/847,472

(22) Filed: Jun. 23, 2022

(65) Prior Publication Data

US 2023/0206528 A1    Jun. 29, 2023

(30) Foreign Application Priority Data

Dec. 28, 2021    (KR) ........................ 10-2021-0190128

(51) Int. Cl.
*G06T 13/20*    (2011.01)
*G06T 7/194*    (2017.01)

(52) U.S. Cl.
CPC .............. *G06T 13/20* (2013.01); *G06T 7/194* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

2020/0213680 A1*  7/2020  Ingel ................ H04N 21/44008
2021/0098024 A1*  4/2021  Xu .......................... G11B 27/06

FOREIGN PATENT DOCUMENTS

| KR | 10-2011-0124222 A | 11/2011 |
| KR | 10-2017-0038622 A | 4/2017 |
| KR | 10-1804844 B1 | 12/2017 |
| KR | 10-2019-0030870 A | 3/2019 |

(Continued)

OTHER PUBLICATIONS

Zhou et al, "Image2GIF: Generating Cinemagraphs using Recurrent Deep Q-Networks", Jan. 27, 2018 (Year: 2018).*

(Continued)

*Primary Examiner* — Yi Wang
(74) *Attorney, Agent, or Firm* — Studebaker & Brackett PC (57) ABSTRACT

A method of training a deep neural network for generating a cinemagraph is disclosed. The method may include preparing a foreground layer input by using an input video, preparing a background layer input by using the input video, providing a foreground layer output and a background layer output from the DNN by inputting, to the DNN, the foreground layer input and the background layer input, providing an output video by synthesizing the foreground layer output with the background layer output, and updating intrinsic parameters of the DNN a plurality of times, based on the input video, the foreground layer input, the foreground layer output, the background layer output, and the output video.

19 Claims, 5 Drawing Sheets

(56) References Cited

FOREIGN PATENT DOCUMENTS

| KR | 10-2020-0065433 A | 6/2020 |
|---|---|---|
| KR | 10-2021-0112364 A | 9/2021 |

OTHER PUBLICATIONS

Mohammad Reza Karimi Dastjerdi, "Cinemagraph Generation from a Static Image with Generative Adversarial Networks", A dissertation submitted to the faculty of Korea Advanced Institute of Science and Technology, Jun. 3, 2019, total 28 pages, Daejeon, Korea.

James Tompkin et al., "Towards Moment Imagery: Automatic Cinemagraphs", ResearchGate, Nov. 2011, total 8 pages.

Jiamin Bai et al., "Selectively De-Animating Video" 2012, total10 pages.

Jiamin Bai et al., "Automatic Cinemagraph Portraits", Eurographics Symposium on Rendering 2013, vol. 32 (2013), No. 4, total 9 pages.

Hang Yan et al., "Turning an Urban Scene Video into a Cinemagraph", arXiv:1612.01235v1 [cs.CV], Dec. 5, 2016, total 12 pages.

Yipin Zhou et al., "Image2GIF: Generating Cinemagraphs Using Recurrent Deep Q-Networks", arXiv:1801.09042v1 [cs.CV], Jan. 27, 2018, http://bvisionll.cs.unc.edu/bigpen/yipin/WACV2018, total 9 pages.

Yuki Endo et al., "Animating Landscape: Self-Supervised Learning of Decoupled Motion and Appearance for Single-Image Video Synthesis", ACM Trans. Graph., vol. 38, No. 6, Article 175. Publication date: Nov. 2019, total 19 pages.

Tavi Halperin et al., "Endless Loops: Detecting and Animating Periodic Patterns in Still Images", ACM Trans. Graph., vol. 40, No. 4, Article 142. Publication date: Aug. 2021, total 12 pages.

Erika Lu et al., "Layered Neural Rendering for Retiming People in Video", ACM Trans. Graph., vol. 39, No. 6, Article 256. Publication date: Dec. 2020, total 14 pages.

Erika Lu et al., "Omnimatte: Associating Objects and Their Effects in Video", https://omnimatte.github.io/, arXiv:2105.06993v2 [cs.CV], Oct. 1, 2021, total 10 pages.

\* cited by examiner

METHOD OF GENERATING CINEMAGRAPH BASED ON DEEP LEARNING

CROSS-REFERENCE TO RELATED APPLICATION

This application claims the benefit of Korean Patent Application No. 10-2021-0190128 filed on Dec. 28, 2021, in the Korean Intellectual Property Office, the entire disclosure of which is incorporated herein by reference for all purposes.

BACKGROUND

1. Field of the Invention

The following disclosure relates to an image processing method based on deep learning.

2. Description of the Related Art

Content that shows a portion of a small but important object that repeatedly moves on the full screen is referred to as a cinemagraph. The cinemagraph includes both a photographic element and a video element. The cinemagraph, which is delicately produced to hilariously show a moving object, is sufficient to attract the attention of a viewer. The movement of the object in the cinemagraph may provide a strong impact that a still image or video may not provide. However, the most interesting effects of the cinemagraph have been produced by a professional photographer. Due to the professionalism required to produce a cinemagraph and time consumption, the cinemagraph is not widely used.

SUMMARY

Example embodiments provide a method of automatically generating a cinemagraph by training a deep neural network (DNN) by using an input video.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided a method of training a DNN for generating a cinemagraph.

The method may include preparing a foreground layer input by using an input video, preparing a background layer input by using the input video, providing a foreground layer output and a background layer output from the DNN by inputting, to the DNN, the foreground layer input and the background layer input, providing an output video by synthesizing the foreground layer output with the background layer output, and updating intrinsic parameters of the DNN a plurality of times, based on the input video, the foreground layer input, the foreground layer output, the background layer output, and the output video.

In an example embodiment, the input video may include a plurality of frames, and the foreground layer input may include foreground masks respectively generated by using the plurality of frames of the input video and each including a first region corresponding to a moving region in a corresponding frame of the input video and a second region corresponding to an unmoving region in the corresponding frame of the input video, foreground noise frames respectively generated by using the foreground masks and each including pixel values representing objects in a plurality of colors randomly selected from a region corresponding to the first region of a corresponding foreground mask, a background noise frame of which pixels include values representing randomly selected colors, and foreground temporal embedding frames.

In an example embodiment, values of pixels in the first region of each of the foreground masks may be "1", and values of pixels in the second region of each of the foreground masks may be "0".

In an example embodiment, each of the foreground noise frames may include pixel values representing spheres in a plurality of colors randomly selected from a region corresponding to the first region of the corresponding foreground mask.

In an example embodiment, a number of foreground temporal embedding frames may be the same as a number of foreground masks and the foreground temporal embedding frames may include pixel values for smooth transition of colors by frames.

In an example embodiment, the background layer input may include a foreground mask of which pixel values are "0", a foreground noise frame of which pixel values are "0", a background noise frame of which pixels include values representing randomly selected colors, and background temporal embedding frames that are the same as the foreground temporal embedding frames of the foreground layer input.

In an example embodiment, a number of the background temporal embedding frames may be the same as a number of frames of the input video and the background temporal embedding frames may include pixel values for smooth transition of colors by frames.

In an example embodiment, in the foreground layer input, any one of the foreground masks, any corresponding one of the foreground noise frames, the background noise frame, and any corresponding one of the foreground temporal embedding frames may configure one foreground layer partial input, in the background layer input, the foreground mask, the foreground noise frame, the background noise frame, and any one of the background temporal embedding frames may configure one background layer partial input, the providing of the foreground layer output and the background layer output from the DNN by inputting, to the DNN, the foreground layer input and the background layer input may include alternately inputting the foreground layer partial inputs and the background layer partial inputs to the DNN, and when any one of the foreground layer partial inputs and a corresponding one of the background layer partial inputs are input to the DNN, a foreground temporal embedding frame included in the any one of the foreground layer partial inputs and a background temporal embedding frame included in the corresponding one of the background layer partial inputs may identify that the any one of the foreground layer partial inputs and the corresponding one of the background layer partial inputs have a same time stamp.

In an example embodiment, the DNN may provide a foreground layer partial output in response to an input of the foreground layer partial input and provide a background layer partial output in response to an input of the background layer partial input, the foreground layer output may include the foreground layer partial outputs and the background layer output may include the background layer partial outputs, and the providing of the output video by synthesizing the foreground layer output with the background layer output may include providing a frame of the output video by synthesizing the foreground layer partial outputs with the background layer partial outputs, respectively.

In an example embodiment, the foreground layer partial output may include a foreground Red green blue (RGB) frame and a foreground alpha matte, the background layer partial output may include a background RGB frame, and the providing of the frame of the output video by synthesizing the foreground layer partial outputs with the background layer partial outputs, respectively, may include providing the frame of the output video by synthesizing the foreground RGB frame with the background RGB frame by using the foreground alpha matte.

In an example embodiment, the providing of the frame of the output video by synthesizing the foreground RGB frame with the background RGB frame by using the foreground alpha matte may include synthesizing the foreground RGB frame with the background RGB frame by using an equation shown below $$\hat{I}_t = A_t^f * C_t^f + (1 - A_t^f) * C_t^b$$

wherein $\hat{I}_t$ denotes a frame of the output video, $A_t^f$ denotes the foreground alpha matte, $C_t^f$ denotes the foreground RGB frame, and $C_t^b$ denotes the background RGB frame.

In an example embodiment, the updating of the intrinsic parameters of the DNN the plurality of times, based on the input video, the foreground layer input, the foreground layer output, the background layer output, and the output video, may include defining a loss function based on the input video, the foreground layer input, the foreground layer output, the background layer output, and the output video, and updating the intrinsic parameters of the DNN the plurality of times to minimize the loss function.

In an example embodiment, the defining of the loss function based on the input video, the foreground layer input, the foreground layer output, the background layer output, and the output video may include defining a frame reconstruction loss function based on a difference between a frame of the input video and a corresponding frame of the output video.

In an example embodiment, the defining of the loss function based on the input video, the foreground layer input, the foreground layer output, the background layer output, and the output video may further include defining a foreground segment reconstruction loss function, wherein the defining of the foreground segment reconstruction loss function may include configuring a first ground truth frame by extracting a moving part from a corresponding frame of the input video by using the foreground mask of the foreground layer partial input, configuring a first frame by extracting a moving part from the foreground RGB frame of the foreground layer partial output corresponding to the foreground layer partial input by using the foreground mask of the foreground layer partial input, and configuring the foreground segment reconstruction loss function based on a difference between the first ground truth frame and the first frame.

In an example embodiment, the defining of the loss function based on the input video, the foreground layer input, the foreground layer output, the background layer output, and the output video may further include defining a mask loss function based on a difference between a foreground mask of the foreground layer partial input and a foreground alpha matte of the foreground layer partial output corresponding to the foreground layer partial input.

In an example embodiment, the defining of the loss function based on the input video, the foreground layer input, the foreground layer output, the background layer output, and the output video may further include defining a background segment reconstruction loss function, wherein the defining of the background segment reconstruction loss function may include configuring a second ground truth frame by extracting an unmoving part from a corresponding frame of the input video by using a foreground mask of the foreground layer partial input, configuring a second frame by extracting an unmoving part from a background RGB frame of the background layer partial output corresponding to the background layer partial input that is input to the DNN after the foreground layer partial input by using a foreground mask of the foreground layer partial input, and configuring the background segment reconstruction loss function based on a difference between the second ground truth frame and the second frame.

In an example embodiment, the defining of the loss function based on the input video, the foreground layer input, the foreground layer output, the background layer output, and the output video may further include defining a partial segment reconstruction loss function, wherein the defining of the partial segment reconstruction loss function may include configuring a partial mask indicating a difference between a foreground mask of the foreground layer partial input and a foreground mask of another foreground layer partial input, configuring a third ground truth frame by extracting a region indicated by the partial mask from a frame of the input video corresponding to the other foreground layer partial input, configuring a third frame by extracting a region indicated by the partial mask from a background RGB frame of the background layer partial outputs, and configuring the partial segment reconstruction loss function based on a difference between the third ground truth frame and the third frame.

In an example embodiment, the loss function may be defined by a sum of the frame reconstruction loss function, the foreground segment reconstruction loss function, the mask loss function, the background segment reconstruction loss function, and the partial segment reconstruction loss function.

According to another aspect, there is provided a method of generating a cinemagraph using a trained DNN. The method may include providing the foreground layer output and the background layer output from the DNN by inputting a foreground layer input and a background layer input, and outputting a cinemagraph by synthesizing the foreground layer output with the background layer output.

According to example embodiments, a cinemagraph may be automatically generated by using a trained DNN.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like constituent elements and a repeated description related thereto will be omitted.

Figure 1:
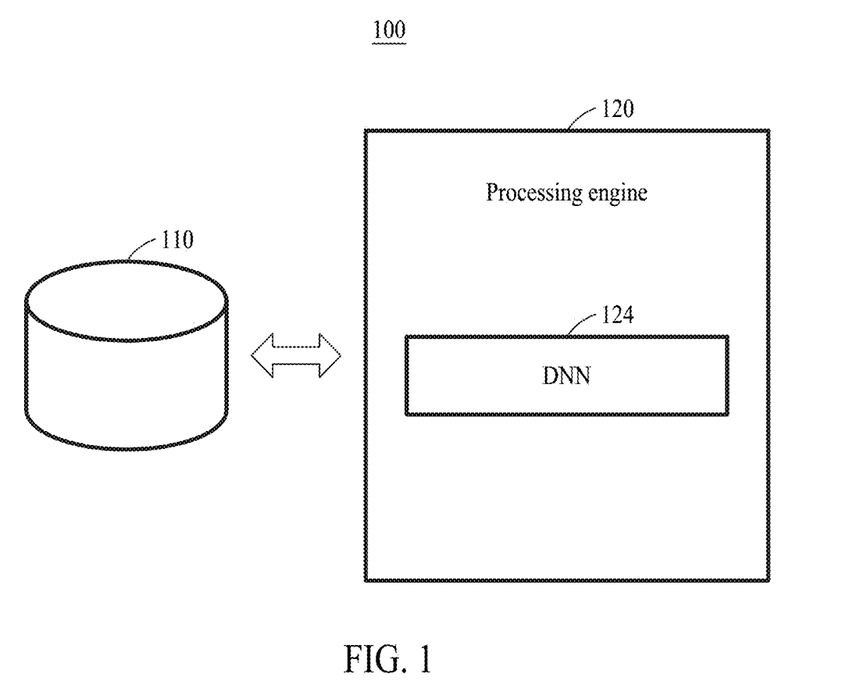
FIG. 1 is a block diagram illustrating an apparatus for generating a cinemagraph based on deep learning.

FIG. 1 is a block diagram illustrating an apparatus for generating a cinemagraph based on deep learning.

As shown in FIG. 1, a cinemagraph generating apparatus 100 may include a database 110. The database 110 may store an input video including a plurality of image frames providing a basis for generating a cinemagraph. The database 110 may be used for storing various types of image frames, which are generated based on the input video, and related data. The database 110 may be implemented in at least one type of storage media of a flash memory type, a hard disk type, a multimedia card micro type, a card memory type (for example, secure digital (SD) or extreme digital (XE) memory), random access memory (RAM), static RAM (SRAM), read-only memory (ROM), electrically erasable programmable ROM (EEPROM), programmable ROM (PROM), magnetic memory, a magnetic disk, and an optical disk. However, one of ordinary skill in the art may understand that the implementation type of the database 110 is not limited thereto.

The cinemagraph generating apparatus 100 may further include a processing engine 120 communicatively coupled to the database 110. The processing engine 120 may implement a deep neural network (DNN) 124, which is a deep learning module, and may be configured to retrieve an input video from the database 110 to thereby prepare a foreground layer input and a background layer input. The processing engine 120 may be further configured to control to provide a foreground layer output and a background layer output from the DNN 124 by inputting, to the DNN 124, the foreground layer input and the background layer input. The processing engine 120 may be further configured to provide a cinemagraph by synthesizing the foreground layer output with the background layer output. The processing engine 120 may be further configured to train the DNN 124 to obtain a high-quality cinemagraph that thoroughly reflects the input video. The processing engine 120 may train the DNN 124 using the input data used for generating the cinemagraph as training data. The processing engine 120 may be further configured to control to update intrinsic parameters of the DNN 124 a plurality of times based on the input video, the foreground layer input, the foreground layer output, the background layer output, and an output video generated by synthesizing the foreground layer output with the background layer output. In an example embodiment, the DNN 124 may be implemented as a plurality of convolutional layers.

Figure 2:
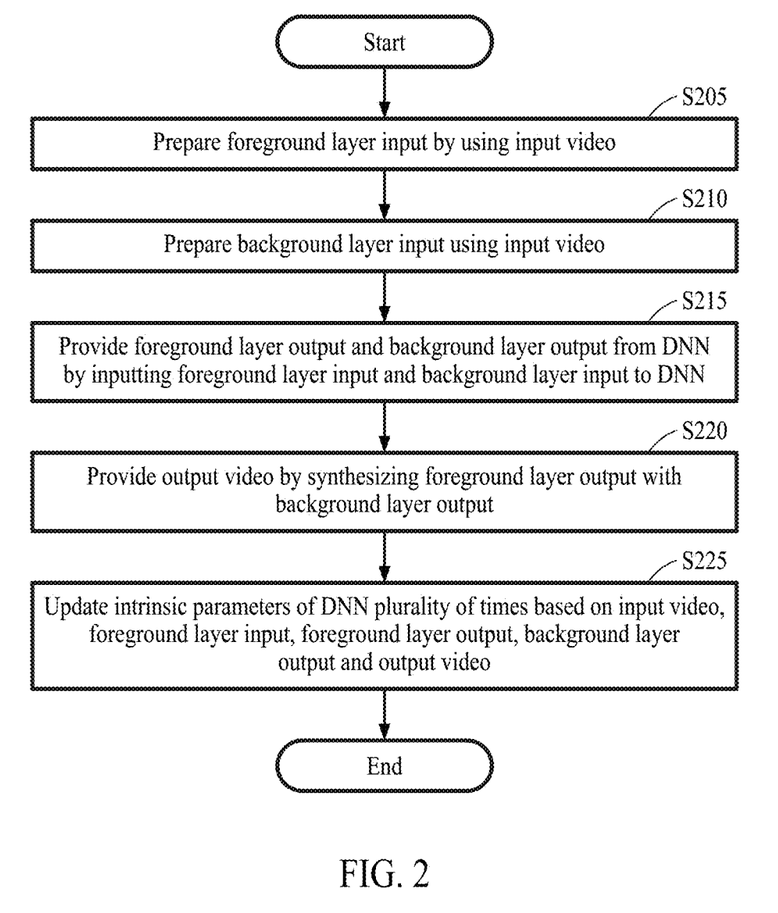
FIG. 2 is a flowchart illustrating a method of training a deep neural network (DNN) to generate a cinemagraph.

FIG. 2 is a flowchart illustrating a method of training a DNN to generate a cinemagraph.

As shown in FIG. 2, the method of training a DNN may begin with step S205 of preparing a foreground layer input by using an input video. A process of preparing the foreground layer input is described below with reference to FIG. 3 that illustrates examples of a foreground layer input and a background layer input generated by using an input video. Hereinafter, a symbol with a subscript t may represent frames changing over time and a symbol without the subscript t may represent a single frame not changing over time. In addition, in the following description, a symbol with a superscript f may represent a frame related to a foreground and a symbol with a superscript b may represent a frame related to a background. The foreground layer input may include foreground masks 334, which is represented by $M_t^f$ and generated by respectively using frames of an input video 310, represented by $I_t$. Each of the foreground masks 334 may have a first region and a second region, the first region corresponding to a moving region in the respective input video frame, and the second region corresponding to a stationary region in the respective input video frame. For example, when a third foreground mask is generated by using a third frame of the input video, the first region in the third foreground mask may be a region corresponding to a moving region that is a wrist and an arm in the third frame of the input video and the second region may be a region corresponding to a background region in the third frame of the input video. In an example embodiment, a first foreground mask may be generated by using a first frame of the input video frame and the remaining foreground masks may be automatically generated by using an optical flow of the input video. In the drawings, the first region is displayed in white and the second region is displayed in black, however, the first region and the second region are not identified by the colors and not limited to these colors. In an example embodiment, pixels in the first region of each of the foreground masks 334 may have a value of "1" and pixels in the second region of each of the foreground masks 334 may have a value of "0".

Figure 3:
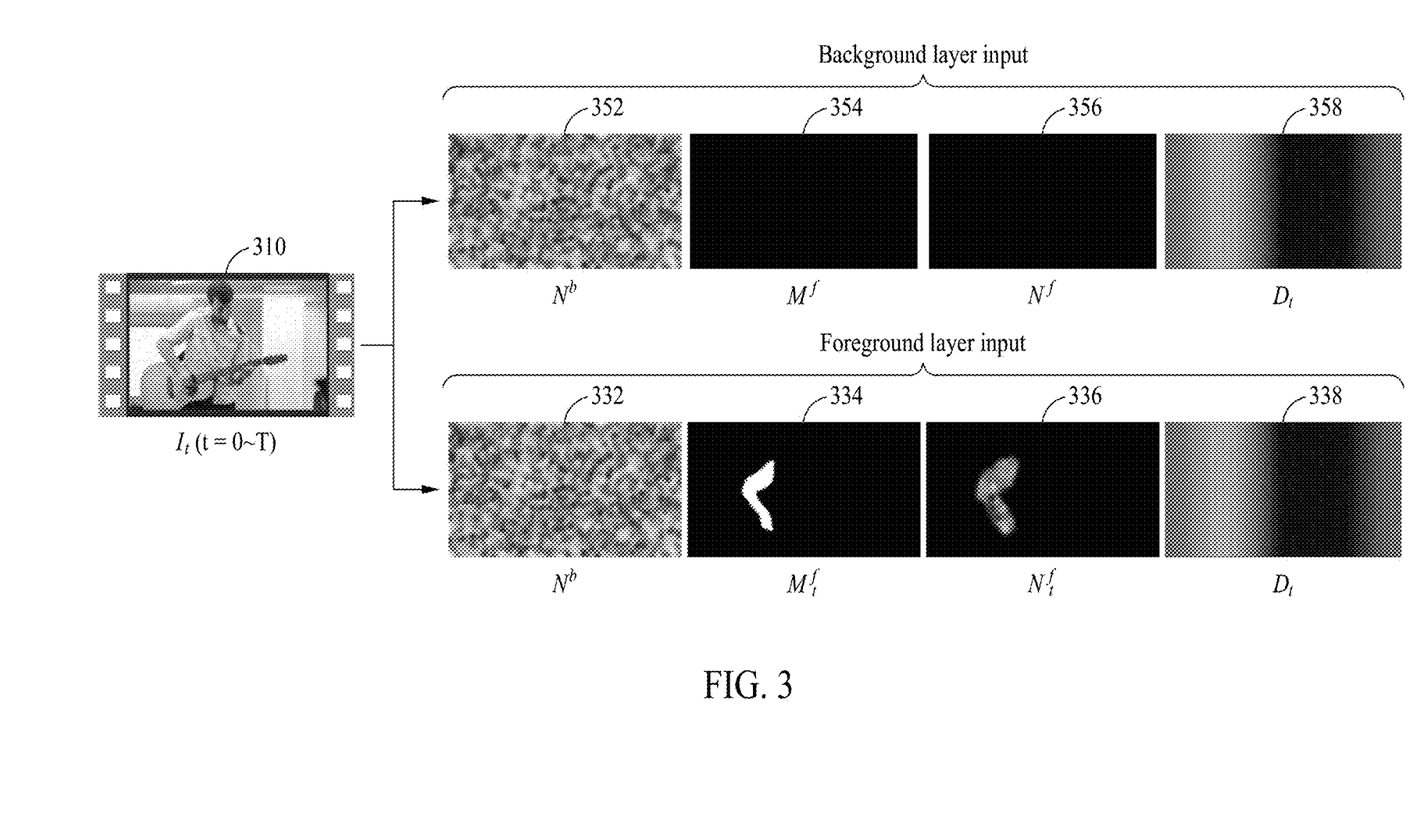
FIG. 3 is a diagram illustrating an example of a foreground layer input and a background layer input generated by using an input video.

The foreground layer input may further include foreground noise frames 336, which is represented by $N_t^f$ and generated by using the foreground masks 334, respectively. Each of the foreground noise frames 336 may include pixel values representing objects with a plurality of colors randomly selected from a region corresponding to the first region of the respective foreground mask. In an example embodiment, each of the foreground noise frames 336 may have pixel values representing spheres in a plurality of colors randomly selected from a region corresponding to the first region of a corresponding foreground mask. Referring to FIG. 3, the foreground noise frame 336 may include spheres in various colors in a wrist and arm region. In addition, referring to FIG. 3, spheres may be randomly disposed in the wrist and arm region of the foreground noise frame 336. The foreground layer input may further include a background noise frame 332, represented by $N^b$. Pixels of the background noise frame 332 may include values representing randomly selected colors. Referring to FIG. 3, the background noise frame 332 may be filled with a noise pattern in various colors. The foreground layer input may further include foreground temporal embedding frames 338, represented by $D_t$. The foreground temporal embedding frames 338 may be used for identifying that the foreground layer input and the background layer input described below are included in the same frame. The number of foreground temporal embedding frames 338 may be the same as the number of foreground masks 334 and the foreground temporal frames 338 may have pixel values for smooth transition of colors by frames. In an example embodiment, the foreground temporal embedding frames 338 may be generated by using a cosine function and/or a sine function. In the foreground layer input, any one of the foreground masks 334, any corresponding one of the foreground noise frames 336, the background noise frame 332, and any corresponding one of foreground temporal embedding frames 338 may configure a foreground layer partial input.

Referring back to FIG. 2, in step S210, a background layer input may be prepared by using the input video 310. A process of preparing the background layer input is described below with reference to FIG. 3. The background layer input may include a foreground mask 354, represented by $M^f$, of which pixel values are "0", and a foreground noise frame 356, represented by $N^f$, of which pixel values are "0". Red green blue (RGB) values of pixels of the foreground mask 354 may be all "0". The RGB values of pixels of the foreground noise frame 356 may be all "0". The background layer input may further include a background noise frame 352 and background temporal embedding frames 358. Pixels of the background noise frame 352 may include values representing randomly selected colors. The background noise frame 352 may be generated by a method that is the same as the method of generating the background noise frame 332. The background temporal embedding frames 358 may be the same as the foreground temporal embedding frame 338 of the foreground layer input. In the background layer input, a foreground mask 354, a foreground noise frame 356, a background noise frame 352, and any one of the background temporal embedding frames 358 may configure a background layer partial input.

Figure 4:
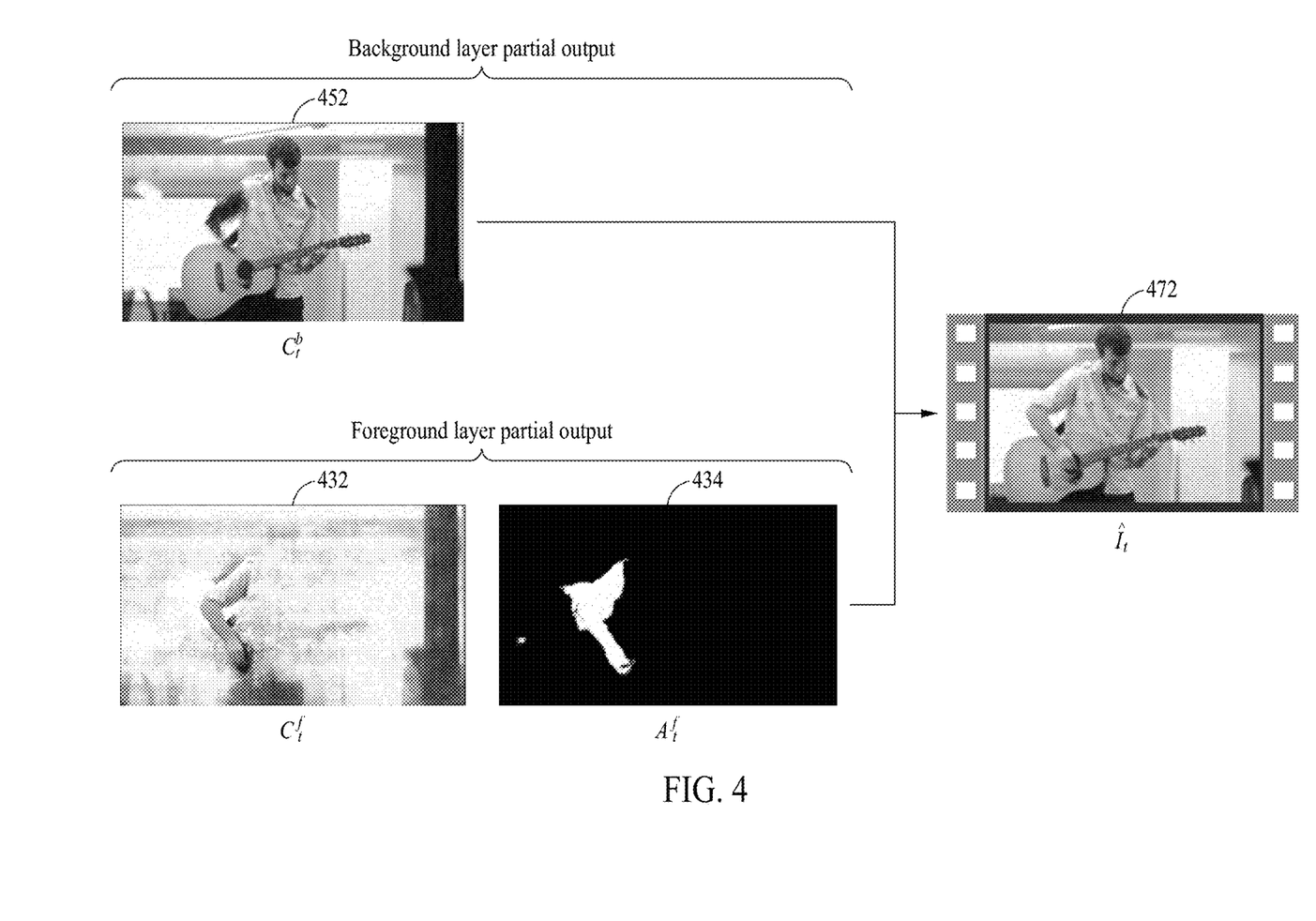
FIG. 4 is a diagram illustrating examples of a foreground layer partial output and a background layer partial output.

Referring back to FIG. 2, in step S215, a foreground layer output and a background layer output from the DNN 124 may be provided by inputting, to the DNN 124, the foreground layer input and the background layer input. In an example embodiment, the foreground layer input and the background layer input may be alternately input to the DNN 124. That is, a first foreground layer partial input, a first background layer partial input, a second foreground layer partial input, a second background layer partial input, and a third foreground layer partial input may be sequentially input to the DNN 124. Here, for example, since the first foreground layer partial input and the first background layer partial input are generated based on the same frame of the input video, the first foreground layer partial input and the first background layer partial input may be included in the same frame and may have the same time stamp. When any one of the foreground layer partial inputs and its corresponding one of the background layer partial inputs are input to the DNN 124, a foreground temporal embedding frame 338 included in the any one of the foreground layer partial inputs and a background temporal embedding frame 358 included in the corresponding one of the background layer partial inputs may identify that the any one of the foreground layer partial inputs and the corresponding one of the background layer partial inputs may have the same time stamp. The DNN 124 may provide a foreground layer partial output in response to an input of the foreground layer partial input and may provide a background layer partial output in response to an input of the background layer partial input. The foreground layer output may be configured with the foreground layer partial outputs, and the background layer output may be configured with the background layer partial outputs. Referring to FIG. 4 illustrating examples of the foreground layer partial output and the background layer partial output, the foreground layer partial output may include a foreground RGB frame 432, represented by $C_t^f$, and a foreground alpha matte 434, represented by $A_t^f$. Pixels of the foreground alpha matte 434 may have a value from 0 to 1. The background layer partial output may include a background RGB frame 452, represented by $C_t^b$.

Referring back to FIG. 2, in step S220, an output video may be provided by synthesizing the foreground layer output with the background layer output. Referring to FIG. 4, in step S220, one frame of an output video 472, represented by $\hat{I}_t$, may be provided by synthesizing each of the foreground layer partial outputs 432 with the corresponding background layer partial output 452. In step S220, one frame of the output video 472 may be provided by synthesizing the foreground RGB frame 432 with the background RGB frame 452 by using the foreground alpha matte 434. In an example embodiment, the foreground RGB frame 432 may be synthesized with the background RGB frame 452 using Equation 1 shown below.

$$\hat{I}_t = A_t^f * C_t^f + (1 - A_t^f) * C_t^b \quad \text{[Equation 1]}$$

Here, $\hat{I}_t$ denotes a frame of the output video 472, $A_t^f$ may denote the foreground alpha matte 434, $C_t^f$ may denote the foreground RGB frame 432, and $C_t^b$ may denote the background RGB frame 452.

According to Equation 1, a region corresponding to a region, whose pixel value is 1, in the foreground alpha matte 434 may be filled with pixel values from the foreground RGB frame 432. A region corresponding to a region, whose pixel value is 1, in the foreground alpha matte 434 may be filled with pixel values from the background RGB frame 452. A region corresponding to a region, whose pixel value is greater than 0 and less than 1, in the foreground alpha matte 434 may be filled with pixel values corresponding to weighted averages of the pixel values from the foreground RGB frame 432 and the pixel values from the background RGB frame 452.

In step S225, intrinsic parameters of the DNN 124 may be updated a plurality of times, based on the input video 310, the foreground layer input, the foreground layer output, the background layer output, and the output video 472. In step S225, a loss function may be defined based on the input video 310, the foreground layer input, the foreground layer output, the background layer output, and the output video 472 and the intrinsic parameters of the DNN 124 may be updated a plurality of times to minimize the loss function. In an example embodiment, the loss function may include a frame reconstruction loss function, a foreground segment reconstruction loss function, a mask loss function, a background segment reconstruction loss function, and a partial segment reconstruction loss function.

In an example embodiment, the frame reconstruction loss function may be constructed based on a difference between one frame of the input video 310 and a respective frame of the output video 472. In an example embodiment, the foreground segment reconstruction loss function may be constructed based on a difference between a first ground truth frame and a first frame. The first ground truth frame may be determined by extracting a moving part in a corresponding frame in the input video 310 by using the foreground mask 334 of the foreground layer input. The first frame may be determined by extracting a moving part in the foreground RGB frame 432 of the foreground layer partial output corresponding to the foreground layer partial input by using the foreground mask 334 of the foreground layer partial input. In an example embodiment, the mask loss function may be constructed based on a difference between the foreground mask 334 of the foreground layer partial input and the foreground alpha matte 434 of the foreground layer partial output corresponding to the foreground layer partial input. The mask loss function may allow the DNN 124 to thoroughly learn position information such that the moving part, such as the wrist and the arm, in the frame of the input video 310 is well reflected in the frame of the output video. In an example embodiment, the background segment reconstruction loss function may be constructed based on a difference between a second ground truth frame and a second frame. The second ground truth frame may be determined by extracting a stationary part in a corresponding frame of the input video 310 by using the foreground mask 334 of the foreground layer partial input. The second frame may be determined by extracting, by using the foreground mask 334 of the foreground layer partial input, a stationary part from the background RGB frame 452 of the background layer partial output corresponding to the background layer partial input, which is input to the DNN 124 after the foreground layer partial input. The partial segment reconstruction loss function may be constructed based on a difference between a third ground truth frame and a third frame. To this end, a partial mask may be determined which represents a difference between the foreground mask 334 of the foreground layer partial input and the foreground mask 334 of a certain foreground layer partial input that is different from the above foreground layer partial input. The third ground truth frame may be determined by extracting a region indicated by the partial mask from a frame of the input video 310, corresponding to the certain foreground layer partial input. The third frame may be determined by extracting a region indicated by the partial mask from a background RGB frame 452 of the background layer partial outputs. The partial segment reconstruction loss function may reflect a difference between a hidden background portion in the current frame of the input video 310 and a corresponding portion in the frame of the output video 472 in the loss function such that the DNN 124 may learn the hidden background portion in an accelerated manner. In an example embodiment, the loss function may be defined by a sum of the frame reconstruction loss function, the foreground segment reconstruction loss function, the mask loss function, the background segment reconstruction loss function, and the partial segment reconstruction loss function. In an example embodiment, when configuring the frame reconstruction loss function, the foreground segment reconstruction loss function, the mask loss function, the background segment reconstruction loss function, and the partial segment reconstruction loss function, a large weight may be assigned to the mask loss function. The example embodiment may be one to allow the DNN 124 to thoroughly learn position information in an early stage of learning. After the DNN 124 thoroughly learns the position information, the weight for the mask loss function may decrease or the loss function may be re-configured such that the mask loss function is not reflected.

In an example embodiment, when a foreground layer partial output and a background layer partial output are provided by inputting a foreground layer partial input and a background layer partial input to the DNN 124, the loss function may be configured and applied to the DNN 124, and each time the loss function is configured and applied to the DNN 124, intrinsic parameters of the DNN 124 may be updated. In this example embodiment, the intrinsic parameters of the DNN 124 may be updated by the number of times corresponding to the number of frames of the input video. In an example embodiment, when a plurality of foreground layer partial outputs and a plurality of background layer partial outputs are provided by inputting a plurality of foreground layer partial inputs and a plurality of background layer partial outputs to the DNN 124, a plurality of loss functions may be configured and an average loss function obtained by averaging the loss functions may be configured and applied to the DNN 124. According to the example embodiment, for each time the plurality of foreground layer partial inputs and the plurality of background layer partial inputs are input to the DNN 124, the intrinsic parameters of the DNN 124 may be updated, and thus, a load of the processing engine 120 may decrease. One of ordinary skill in the art may recognize that two example embodiments described above fall within the scope of the claims of the present disclosure.

Figure 5:
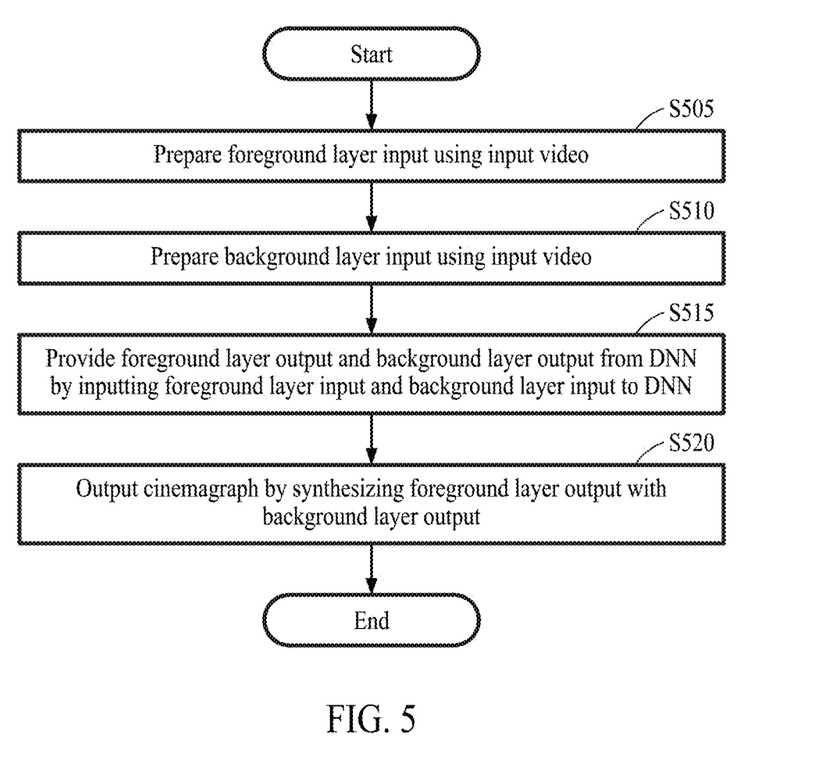
FIG. 5 is a flowchart illustrating a method of generating a cinemagraph using a trained DNN.

FIG. 5 is a flowchart illustrating a method of generating a cinemagraph using a trained DNN.

As shown in FIG. 5, the method of generating a cinemagraph may begin with step S505 of preparing a foreground layer input by using an input video. The foreground layer input may include a foreground mask 334, a foreground noise frame 336, a background noise frame 332, and a foreground temporal embedding frame 338. Since the foreground mask 334, the foreground noise frame 336, the background noise frame 332, and the foreground temporal embedding frame 338 are the same as those used for training the DNN 124, detailed descriptions thereof are omitted. In step S510, a background layer input may be prepared by using the input video. The background layer input may include a foreground mask 354, a foreground noise frame 356, a background noise frame 352, and a background temporal embedding frame 358. The foreground mask 354, the foreground noise frame 356, and the background noise frame 352 may be the same as those used for training the DNN 124. However, the background temporal embedding frame 358 may be different from that used for training the DNN 124 and may be fixed to an embedding frame corresponding to a frame of the input video 310 desired to be fixed as the background. In step S515, the foreground layer output and the background layer output may be provided by the DNN 124 by inputting, to the DNN 124, the foreground layer input and the background layer input. In step S520, a cinemagraph may be output by synthesizing the foreground layer output with the background layer output.

The examples described herein may be implemented using hardware components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of training a deep neural network (DNN) for generating a cinemagraph, the method comprising:
   preparing a foreground layer input by using an input video;
   preparing a background layer input by using the input video;
   providing a foreground layer output and a background layer output from the DNN by inputting, to the DNN, the foreground layer input and the background layer input;
   providing an output video by synthesizing the foreground layer output with the background layer output; and
   updating intrinsic parameters of the DNN a plurality of times, based on the input video, the foreground layer input, the foreground layer output, the background layer output, and the output video,
   wherein the input video comprises a plurality of frames, and
   the foreground layer input comprises:
   foreground masks respectively generated by using the plurality of frames of the input video and each comprising a first region corresponding to a moving region in a corresponding frame of the input video and a second region corresponding to an unmoving region in the corresponding frame of the input video;
   foreground noise frames respectively generated by using the foreground masks and each comprising pixel values representing objects in a plurality of colors randomly selected from a region corresponding to the first region of a corresponding foreground mask;
   a background noise frame of which pixels comprise values representing randomly selected colors; and
   foreground temporal embedding frames.

2. The method of claim 1, wherein values of pixels in the first region of each of the foreground masks are "1", and values of pixels in the second region of each of the foreground masks are "0".

3. The method of claim 1, wherein each of the foreground noise frames comprises pixel values representing spheres in a plurality of colors randomly selected from a region corresponding to the first region of the corresponding foreground mask.

4. The method of claim 1, wherein a number of foreground temporal embedding frames is the same as a number of foreground masks and the foreground temporal embedding frames comprise pixel values for smooth transition of colors by frames.

5. The method of claim 1, wherein the background layer input comprises:
   a foreground mask of which pixel values are "0";
   a foreground noise frame of which pixel values are "0";

a background noise frame of which pixels comprise values representing randomly selected colors; and background temporal embedding frames that are the same as the foreground temporal embedding frames of the foreground layer input.

6. The method of claim 5, wherein a number of the background temporal embedding frames is the same as a number of frames of the input video and the background temporal embedding frames comprise pixel values for smooth transition of colors by frames.

7. The method of claim 5, wherein, in the foreground layer input, any one of the foreground masks, any corresponding one of the foreground noise frames, the background noise frame, and any corresponding one of the foreground temporal embedding frames configure one foreground layer partial input, in the background layer input, the foreground mask, the foreground noise frame, the background noise frame, and any one of the background temporal embedding frames configure one background layer partial input, the providing of the foreground layer output and the background layer output from the DNN by inputting, to the DNN, the foreground layer input and the background layer input comprises alternately inputting the foreground layer partial inputs and the background layer partial inputs to the DNN, and when any one of the foreground layer partial inputs and a corresponding one of the background layer partial inputs are input to the DNN, a foreground temporal embedding frame comprised in the any one of the foreground layer partial inputs and a background temporal embedding frame comprised in the corresponding one of the background layer partial inputs identify that the any one of the foreground layer partial inputs and the corresponding one of the background layer partial inputs have a same time stamp.

8. The method of claim 7, wherein the DNN provides a foreground layer partial output in response to an input of the foreground layer partial input and provides a background layer partial output in response to an input of the background layer partial input, the foreground layer output comprises the foreground layer partial outputs and the background layer output comprises the background layer partial outputs, and the providing of the output video by synthesizing the foreground layer output with the background layer output comprises providing a frame of the output video by synthesizing the foreground layer partial outputs with the background layer partial outputs, respectively.

9. The method of claim 8, wherein the foreground layer partial output comprises a foreground Red green blue (RGB) frame and a foreground alpha matte, the background layer partial output comprises a background RGB frame, and the providing of the frame of the output video by synthesizing the foreground layer partial outputs with the background layer partial outputs, respectively, comprises providing the frame of the output video by synthesizing the foreground RGB frame with the background RGB frame by using the foreground alpha matte.

10. The method of claim 9, wherein the providing of the frame of the output video by synthesizing the foreground RGB frame with the background RGB frame by using the foreground alpha matte comprises:

synthesizing the foreground RGB frame with the background RGB frame by using an equation shown below $$\hat{I}_t = A_t^f * C_t^f + (1-A_t^f) * C_t^b$$

wherein $\hat{I}_t$ denotes a frame of the output video, $A_t^f$ denotes the foreground alpha matte, $C_t^f$ denotes the foreground RGB frame, and $C_t^b$ denotes the background RGB frame.

11. The method of claim 10, wherein the updating of the intrinsic parameters of the DNN the plurality of times, based on the input video, the foreground layer input, the foreground layer output, the background layer output, and the output video, comprises:

defining a loss function based on the input video, the foreground layer input, the foreground layer output, the background layer output, and the output video; and updating the intrinsic parameters of the DNN the plurality of times to minimize the loss function.

12. The method of claim 11, wherein the defining of the loss function based on the input video, the foreground layer input, the foreground layer output, the background layer output, and the output video comprises defining a frame reconstruction loss function based on a difference between a frame of the input video and a corresponding frame of the output video.

13. The method of claim 12, wherein the defining of the loss function based on the input video, the foreground layer input, the foreground layer output, the background layer output, and the output video further comprises defining a foreground segment reconstruction loss function, wherein the defining of the foreground segment reconstruction loss function comprises:

configuring a first ground truth frame by extracting a moving part from a corresponding frame of the input video by using the foreground mask of the foreground layer partial input;

configuring a first frame by extracting a moving part from the foreground RGB frame of the foreground layer partial output corresponding to the foreground layer partial input by using the foreground mask of the foreground layer partial input; and configuring the foreground segment reconstruction loss function based on a difference between the first ground truth frame and the first frame.

14. The method of claim 13, wherein the defining of the loss function based on the input video, the foreground layer input, the foreground layer output, the background layer output, and the output video further comprises defining a mask loss function based on a difference between a foreground mask of the foreground layer partial input and a foreground alpha matte of the foreground layer partial output corresponding to the foreground layer partial input.

15. The method of claim 14, wherein the defining of the loss function based on the input video, the foreground layer input, the foreground layer output, the background layer output, and the output video further comprises defining a background segment reconstruction loss function, wherein the defining of the background segment reconstruction loss function comprises:

configuring a second ground truth frame by extracting an unmoving part from a corresponding frame of the input video by using a foreground mask of the foreground layer partial input;

configuring a second frame by extracting an unmoving part from a background RGB frame of the background layer partial output corresponding to the background layer partial input that is input to the DNN after the foreground layer partial input by using a foreground mask of the foreground layer partial input; and configuring the background segment reconstruction loss function based on a difference between the second ground truth frame and the second frame.

16. The method of claim 15, wherein the defining of the loss function based on the input video, the foreground layer input, the foreground layer output, the background layer output, and the output video further comprises defining a partial segment reconstruction loss function,
wherein the defining of the partial segment reconstruction loss function comprises:
configuring a partial mask indicating a difference between a foreground mask of the foreground layer partial input and a foreground mask of another foreground layer partial input;
configuring a third ground truth frame by extracting a region indicated by the partial mask from a frame of the input video corresponding to the other foreground layer partial input;
configuring a third frame by extracting a region indicated by the partial mask from a background RGB frame of the background layer partial outputs; and
configuring the partial segment reconstruction loss function based on a difference between the third ground truth frame and the third frame.

17. The method of claim 16, wherein the loss function is defined by a sum of the frame reconstruction loss function, the foreground segment reconstruction loss function, the mask loss function, the background segment reconstruction loss function, and the partial segment reconstruction loss function.

18. A method of generating a cinemagraph using a trained deep neural network (DNN) according to the method of claim 1, the method comprising:
providing the foreground layer output and the background layer output from the DNN by inputting a foreground layer input and a background layer input; and
outputting a cinemagraph by synthesizing the foreground layer output with the background layer output.

19. A non-transitory computer-readable storage medium storing instructions that, when executed by a processor, cause the processor to perform the method of claim 1.

* * * * *